(12) United States Patent
Lee et al.

(10) Patent No.: US 6,594,053 B1
(45) Date of Patent: Jul. 15, 2003

(54) APPARATUS FOR CONTROLLING CYCLES OF OPTICAL PULSE STREAM BASED ON TIME CORRELATION

(75) Inventors: Hyuek Jae Lee, Taejon (KR); Hae Geun Kim, Taejon (KR); Jee Yon Choi, Taejon (KR); Sung Wan Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/432,392

(22) Filed: Nov. 2, 1999

(30) Foreign Application Priority Data

Nov. 23, 1998 (KR) ........................................ 1998-50198

(51) Int. Cl.[7] .............................................. H04B 10/00
(52) U.S. Cl. ...................................................... 359/158
(58) Field of Search ................................. 359/158, 179, 359/188

(56) References Cited

U.S. PATENT DOCUMENTS

| | | | | |
|---|---|---|---|---|
| 4,923,267 A | | 5/1990 | Su ........................... 350/96.16 |
| 5,032,010 A | | 7/1991 | Su ............................... 350/354 |
| 5,155,779 A | | 10/1992 | Avramopoulos et al. ...... 385/24 |
| 5,706,113 A | * | 1/1998 | Kawanishi et al. .......... 359/158 |
| 5,857,040 A | * | 1/1999 | Bigo et al. ..................... 385/15 |
| 6,323,979 B1 | * | 11/2001 | Bigo ............................ 359/158 |

OTHER PUBLICATIONS

"All–optical, all–fiber circulating shift register with an inverter" by N.A. Whitaker, Jr., et al., Optics Letter, vol. 16, No. 24, Dec. 15, 1991, pp. 1999–2001.

"All–optical circulating shift register using a semiconductor optical amplifier in a fibre loop mirror" by A.J. Poustie et al., Electronics Letters, vol. 32, No. 13, Jun. 20, 1996, pp. 1215–1216.

"40–Gbit/s all–optical circulating shift register with an inverter" by K.L. Hall et al., Optics Letters, vol. 22, No. 19, Oct. 1, 1997, pp. 1479–1481.

"All–optical clock division using a semiconductor optical amplifier loop mirror with feedback" by R. J Manning, et al., Electronics Letters, vol. 32, No. 16, Aug. 1, 1996, pp. 1504–1505.

"All–optical clock division at 10 and 20GH$_z$ in a semiconductor optical amplifier based on nonlinear loop mirror" by A. E. Kelly et al., Electronics Letters, vol. 34, No. 13, Jun. 25, 1998, pp. 1337–1339.

"Nonlinear optical loop mirrors with feedback and a slow nonlinearity" by K. J. Blow et al., Optics Communications 134 (1997), pp. 43–48.

* cited by examiner

Primary Examiner—Leslie Pascal
Assistant Examiner—Dalzid Singh
(74) Attorney, Agent, or Firm—Antonelli, Terry, Stout & Kraus, LLP

(57) ABSTRACT

An apparatus for controlling cycles of optical pulse streams based on a time correlation is disclosed. The feedback optical pulses and the input optical pulses are subjected to a time interleaving so as to make them not overlapped together, and then they are subjected to a time correlation, thereby considerably reducing the polarized beam dependence of the input optical pulse streams. The apparatus includes a clock generating means for generating clocks, and an optical pulse generating means for receiving the clocks from the clock generating means to generate optical pulses in synchronization with the pulses of the clock generating means. An input optical pulse distributing means distributes the feedback optical pulses of an output optical pulse distributing means, and distributes the optical pulses of the optical pulse generating means. A time correlation means correlates the time of optical pulses of the input optical pulse distributing means, and an optical pulse transferring/processing means amplifies and filters the optical pulses of the time correlation means to attenuate them. An output optical distributing means distributes the optical pulses of the optical pulse transferring/ processing means.

4 Claims, 4 Drawing Sheets

APPARATUS FOR CONTROLLING CYCLES OF OPTICAL PULSE STREAM BASED ON TIME CORRELATION

BACKGROUND OF THE INVENTION

1. Field of the Invention

The present invention relates to an apparatus for controlling cycles of optical pulse streams which are used for data reception and transmission in communication systems or the like. Particularly the present invention relates to an apparatus for controlling cycles of optical pulse streams based on a time correlation.

2. Description of the Prior Art

Recently, the researches on the processing of ultra-high optical signals for optical communications are briskly carried out. In connection to this, the all-optical circulating shift register and the clock frequency division are the important elements in the all-optical communication network.

The former is used as an optical block memory, i.e., as an optical buffer, while the latter can be used as a clock frequency division for inversely multiplexing the optical time division multiplex signals.

An all-optical circulating shift register which has an inverter and utilizes an optical multiplication logic and a nonlinear optical loop mirror (NOLM) based on a diffusion-shifted fiber (DSF) was first carried out in the following reference. [N. A. Whitaker, Jr., M. C. Gabriel, H. Avrampoulus, and A. Huang, "ALL-OPTICAL, ALL-FIBER CIRCULATING SHIFT REGISTER WITH AN INVERTER", Opt. Lett., vol. 16, No. 24, pp 1999–2001, 1991].

This DSF-NOLM method is capable of realizing an ultrahigh speed operation, but its structure is bulky, and requires a high switching energy.

Recently, the ultra-high speed all-optical switching, the wavelength converter and the optical regenerator are briskly studied based on the non-linearity of a semiconductor optical amplifier. These devices are calling attention, because they have the possibility of a high operation speed. Particularly, they can be made into a compact form, and therefore, they are being illuminated as important components.

Further, an all-optical circulating shift register which utilizes the multiplication logic function using a time correlation device for setting a semiconductor optical amplifier in the optical fiber loop mirror was experimentally proved in the following reference [A. J. Poustie, R. J. Manning, and K. J. Blow, "ALL-OPTICAL CIRCULATING SHIFT REGISTER USING A SEMICONDUCTOR OPTICAL AMPLIFIER IN A FIBER LOOP", Electron. Lett., vol 32, pp 1215–1216, 1996]

Recently, a circulating shift register of 40 Gb/s using an interferometer based on a semiconductor optical amplifier was realized in the following reference [K. L. Hall, J. P. Donnelly, S. H. Groves, C. I. Fennely, R. J. Bailey, and A. Napoleowe, "40 Gb/s ALL-OPTICAL CIRCULATING SHIFT REGISTER WITH AN INVERTER", Opt. Lett., vol. 22, pp 1479–1481, 1997].

Further, a clock frequency division for an input optical pulse stream of 10 GHz and 20 GHz was successfully carried out in the following reference. [A. E. Kelly, R. J. Manning, A. J. Poustie, and K. J. Blow, "ALL-OPTICAL CLOCK DIVISION AT 10 AND 20 GHz IN A SEMICONDUCTOR OPTICAL AMPLIFIER BASED ON NONLINEAR LOOP MIRROR", Electron. Lett., vol. 34, pp 1337–1339, 1998]

In the above described conventional methods, however, the feedback optical pulses are incident into the optical fiber loop perpendicularly to the input optical pulses, so that the feedback optical pulses can serve as switching optical pulses. Therefore, the total system essentially becomes sensitive to the polarized beams. Further, a switching technique based on the circulation of polarized beams is resorted to, and therefore, the system further becomes sensitive to the input polarized beams.

SUMMARY OF THE INVENTION

The present invention is intended to overcome the above described disadvantages of the conventional techniques.

Therefore it is an object of the present invention to provide an apparatus for controlling cycles of optical pulse streams, in which the feedback optical pulses and the input optical pulses are subjected to a time interleaving so as to make them not overlapped together, and then they are subjected to a time correlation, thereby considerably reducing the polarized beam dependence of the input optical pulse streams.

In achieving the above object, the apparatus for controlling cycles of optical pulse streams according to the present invention includes: a clock generating means for generating clocks; an optical pulse generating means for receiving the clocks from the clock generating means to generate optical pulses in synchronization with the clocks of the clock generating means; an input optical pulse distributing means for distributing feedback optical pulses of an output optical pulse distributing means, and for distributing the optical pulses of the optical pulse generating means; a time correlation means for correlating a time of optical pulses of the input optical pulse distributing means; an optical pulse transferring means for amplifying and filtering the optical pulses of the time correlation means, and for attenuating them before transferring them; and the output optical pulse distributing means distributing the optical pulses of the optical pulse transferring means to transfer them to an output terminal and to the input optical pulse distributing means.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
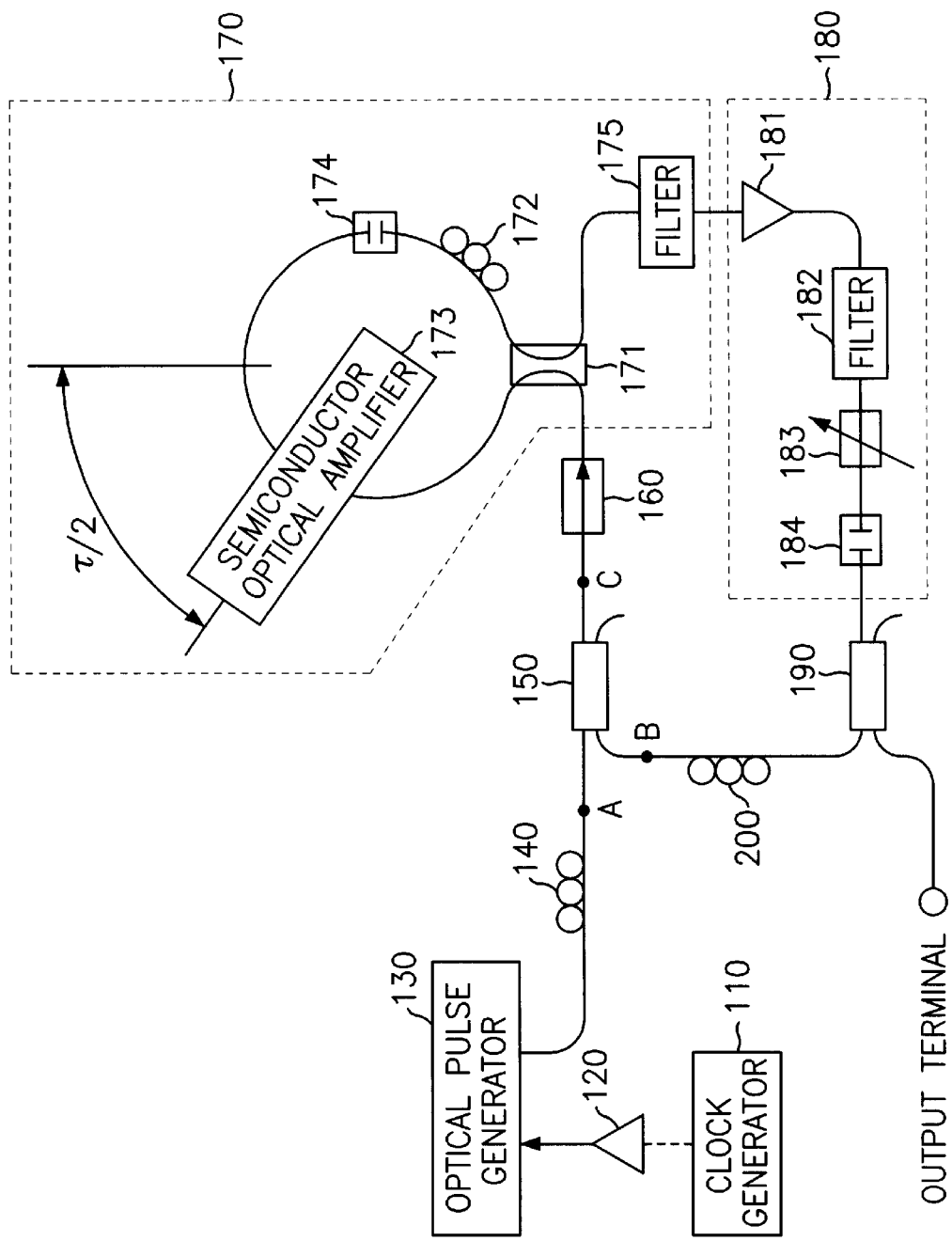
FIG. 1 illustrates the constitution of the optical pulse stream cycle adjusting apparatus based on a time correlation according to the present invention.

FIG. 1 illustrates the constitution of the optical pulse stream cycle adjusting apparatus based on a time correlation according to the present invention.

As shown in FIG. 1, the apparatus for controlling the cycles of optical pulse streams according to the present invention includes: a clock generator 110 for generating clocks; a clock amplifier 120 for amplifying the clocks of the clock generator 110; an optical pulse generator 130 for receiving the clocks from the clock amplifier 120 to generate optical pulses in synchronization with the pulses of the clock generator 110; a polarization adjustor 140 for adjusting the polarization of the optical pulses of the optical pulse generator 130; an input optical pulse distributor 150 for distributing the feedback optical pulses of an output optical pulse distributor 190, and for distributing the optical pulses of the optical pulse generator 130 after their modulation; an optical transmitter/breaker 160 for transmitting optical pulses of the input optical pulse distributor 150, and for preventing the optical signals of a time correlator 170 from being transmitted to the input optical pulse distributor 150; the time correlator 170 correlating the time of optical pulses of the optical transmitter/breaker 160; an optical pulse transferring/processing section 180 for amplifying and filtering the optical pulses of the time correlator 170, and for attenuating them before transferring them; the output optical pulse distributor 190 distributing the optical pulses of the optical pulse transferring/processing section 180 to transfer them to an output terminal and to the input optical pulse distributor 150; and a polarization adjustor 200 for adjusting a polarization of optical pulses of the output optical pulse distributor 190 to feedback them to the input optical pulse distributor 150.

The polarization adjustors 140 and 200 respectively employ a 3 dB coupler.

The time correlator 170 includes: a distributor/coupler 171; a polarization adjustor 172 with its first input/output terminals connected to the distributor/coupler 171; a semiconductor optical amplifier 173 with its first input/output terminals connected to the distributor/coupler 171; a delayer 174 with its first input/output terminals connected to the second input/output terminals of the semiconductor optical amplifier 173, and with its second input/output terminals connected to second input/output terminals of the polarization adjustor 172; and a filter 175 connected between the distributor/coupler 171 and the optical pulse transferring/processing section 180.

Now the time correlator 170 will be described as to its operations.

The distributor/coupler 171 distributes the optical pulses of the optical transmitter/breaker 160 to the polarization adjustor 172 and to the semiconductor optical amplifier 173.

Then the polarization adjustor 172 transfers the polarized beams of the optical pulses from the distributor/coupler 171 to the delayer 174. Then the semiconductor optical amplifier 173 amplifies the delayed pulses of the delayer 174 to transfer them to the distributor/coupler 171.

The optical pulses which have been distributed by the distributor/coupler 171 and which have been transferred to the semiconductor optical amplifier 173 are amplified by the semiconductor optical amplifier 173. Then the pulses are delayed by the delayer 174 to be transferred to the polarization adjustor 172 which adjusts the polarization of the optical pulses of the delayer 174 to transfer them to the distributor/coupler 171.

The optical pulses which have undergone the time correlation process are coupled by the distributor/coupler 171. Then noises are removed from the optical pulses by the filter 175, and then the pulses are transferred to the optical pulse transferring/processing section 180.

The optical pulse transferring and processing section 180 includes: an optical amplifier 181 for amplifying the optical pulses of the time correlator 170; a filter 182 for removing noises by filtering the output optical pulses of the optical amplifier 181; an optical pulse attenuator 183 for variably attenuating the optical pulses after their noise removal by the filter 182; and a delayer 184 for delaying the attenuated optical pulses of the optical pulse attenuator 183 to transfer them to the output optical pulse distributor 190.

Now the optical pulse stream cycle controlling apparatus of the present invention constituted as above will be described as to its operation.

The clocks which have been generated by the clock generator 110 are amplified by the clock amplifier 120 to be transferred to the optical pulse generator 130. Then the optical pulse generator 130 receives the clocks from the clock amplifier 120 to generate optical pulses in synchronization with the pulses of the clock generator 110.

Thus the synchronized optical pulses are polarized by the polarization adjustor 140, and then are distributed by the optical distributor 150. Then they are transferred through the optical transmitter/breaker 160 to the time correlator 170.

The optical pulses which have been transferred to the time correlator 170 are transferred to the optical pulse transferring/processing section 180.

The optical amplifier 181 of the optical pulse transferring/processing section 180 amplifies the optical pulses of the time correlator 170, to transfer them to the filter 182.

The filter 182 removes noises from the amplified optical pulses to transfer them to the optical pulse attenuator 183. The attenuator 183 attenuates the noise-removed optical pulses, to transfer them through a delayer 184 to the output optical pulse distributor 190.

Then the output optical pulse distributor 190 transfers a part of the optical pulses to the output terminal, and transfers another part of the optical pulses through the polarization adjustor 200 to the input optical pulse distributor 150.

Meanwhile, the optical pulses which have been transferred to the input optical distributor 150 by the output optical pulse distributor 190 are transferred to the output optical distributor 190 through the above described process.

Now the optical pulse stream cycle controlling apparatus of the present invention will be described as to its characteristics by referring to FIGS. 2a to 2c.

Figure 2A:
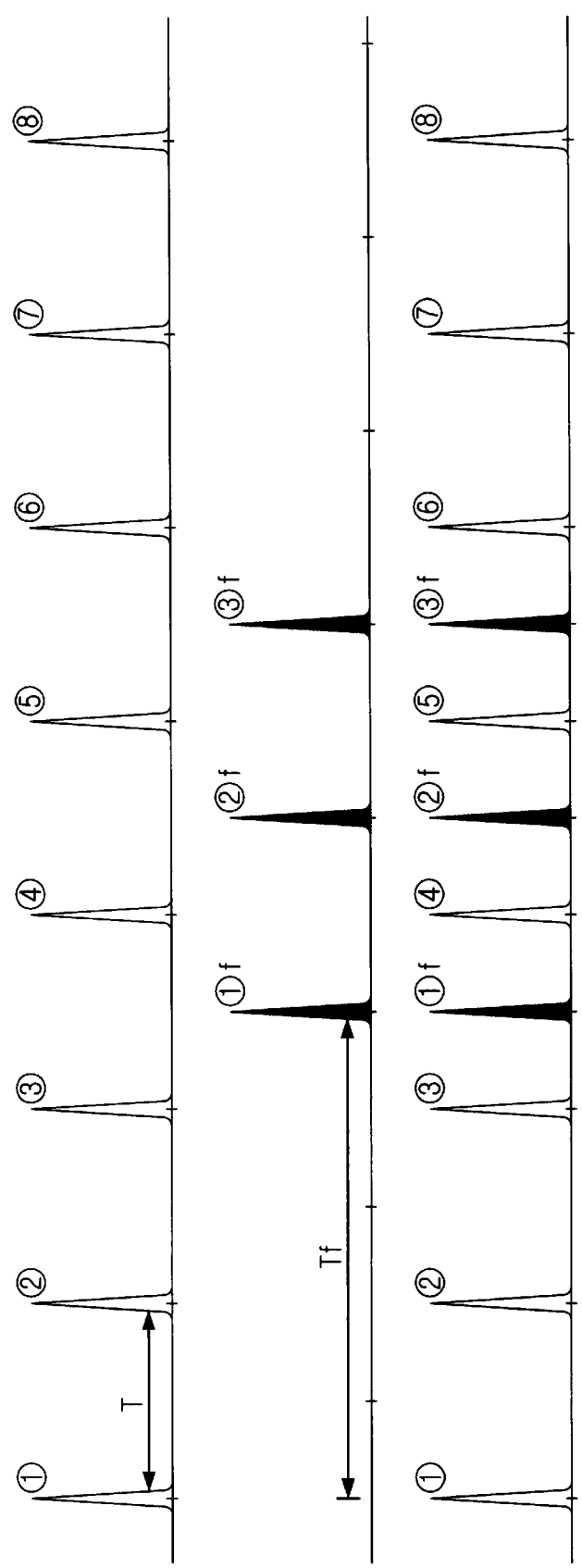
FIGS. 2a and 2c illustrate the characteristics of the optical pulse stream cycle adjusting apparatus based on a time correlation according to the present invention.
Figure 2B:
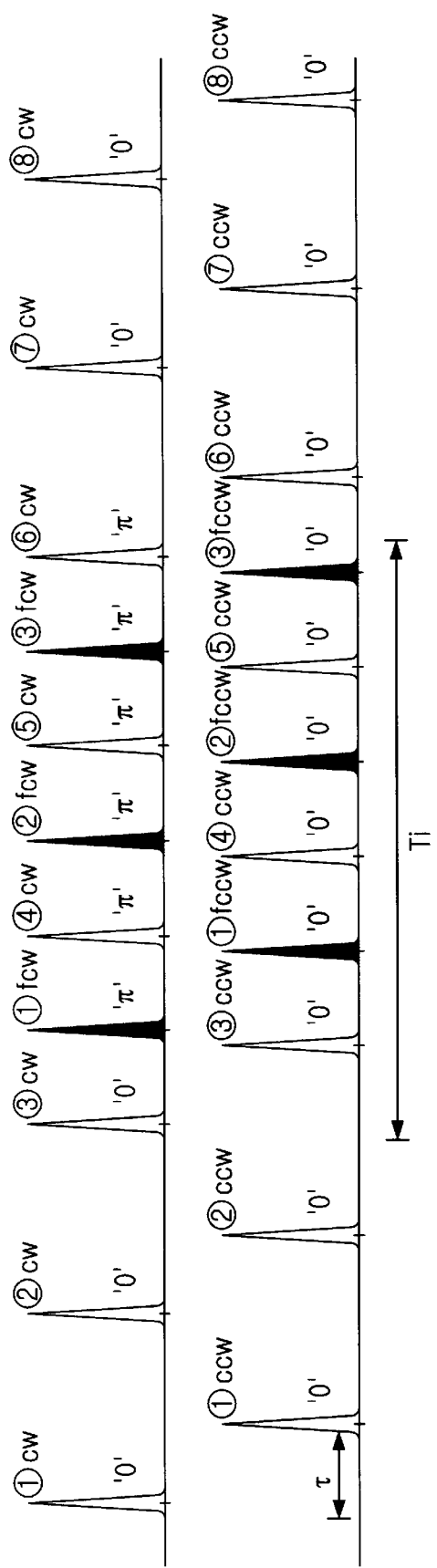
Figure 2C:
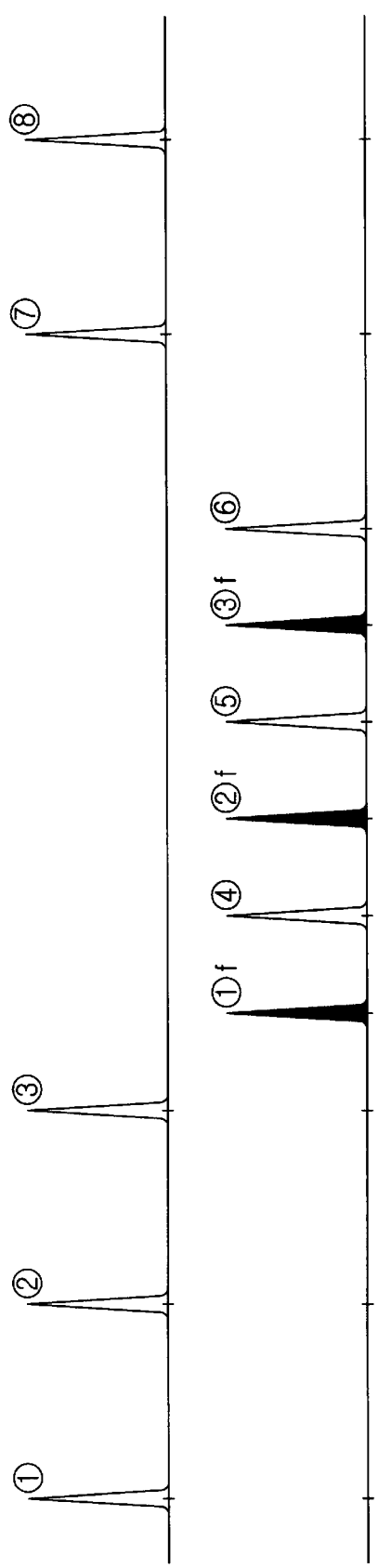

FIGS. 2a and 2c illustrate the characteristics of the optical pulse stream cycle adjusting apparatus based on a time correlation according to the present invention. Here, the principles of the all-optical circulating shift register are resorted to.

The time from an input to the optical pulse will be assumed to be T. The time which is elapsed from the input optical distributor 150 through the time correlator 170 to the input optical distributor 150 (feedback) will be assumed to be Tf. Here, Tf equals to $nT+T/r$, where n is an integer, and r is a real number larger than 0.0 and smaller or equal to 2.0 (i.e., $0.0<r<2.0$).

Referring to FIGS. 2a to 2c, the first feedback optical pulse (1)f is positioned between an optical pulse (3) and an optical pulse (4). Here, n=2, r=2.0, and therefore, Tf=2.5T.

In order to help the understanding, $\alpha$ of the distributor/coupler 171 will be assumed to be 0.5, and it will be further assumed that, in the optical fiber loop of the time correlator 170, the clockwise and anti-clockwise optical pulses receive the same gain from the semiconductor optical amplifier 173. Further, it will be assumed that the transmission time of the semiconductor optical amplifier 173 is smaller than T/2.

The semiconductor optical amplifier 173 lies asymmetrically by r/2 from the center of the optical fiber loop within the time correlator 170.

FIG. 2a illustrates the shapes of the optical pulse streams at points A, B and C of FIG. 1. FIG. 2b illustrates the clockwise and anti-clockwise optical pulse streams which arrive at the semiconductor optical amplifier 173 when r is slightly smaller than T/2. Particularly, the phase shifts of the respective optical pulse streams by the semiconductor optical amplifier 173 are illustrated.

Referring to FIG. 2b, the optical pulse (1)ccw arrives at the semiconductor optical amplifier 173 after the optical pulse (1)cw passes through the semiconductor optical amplifier 173. Since the carrying time by the semiconductor optical amplifier 173 was assumed to be smaller than T/2, there is no relative phase shift in the optical pulse (1)ccw.

However, in the feedback optical pulse (1)fcw, there is a relative phase shift as much as n by being caused by the preceding optical pulse (3)ccw.

The phase shift of the feedback optical pulse (1)fcw depends on the optical power of the optical pulse (3)ccw and on the time interval between the optical pulse (1)cw and the optical pulse (3)ccw (i.e, T/2−r). Here, however, the phase shift will be indicated by n for the sake of simplification.

Accordingly, since the time correlator 170 consists of optical fiber loop mirrors, the reflected optical pulses and the transmitted optical pulses of the time correlator 170 become as shown in FIG. 2c, owing to the relative phase shifts of the respective optical pulses.

That is, the time correlator 170 reflects the optical pulses which have a time interval of T/2 in the input optical pulse streams, while the time correlator 170 permits the input optical pulses having a time interval of T to be passed. Further, the reflected optical pulse streams are prevented from being transferred to the optical pulse generator 130 by the optical transmitter/breaker 160.

Meanwhile, also in the case where r is slightly larger than T/2, the same all-optical circulating shift register can be formed. In this case, however, the number of the circulating optical clock bits is 2, while in FIGS. 2a to 2c, it is 3.

Further, according as r becomes smaller than 2.0 in FIG. 2b, there appear differences between the influence of the optical pulse (3)ccw on the optical pulse (1)fcw and the influence of the optical pulse (1)fccw on the optical pulse (4)cw.

That is, in the case of the former, the time difference between the optical pulses increases to T/r−r, while in the case of the latter, it decreases to (r−1)T/r−r.

This difference is repeated in the region Ti.

Therefore, complicated dynamic characteristics begin to appear similarly to the evaluation results of the reference [R. J. Manning, A. J. Poustie, and K. J. Blow, "NONLINEAR OPTICAL LOOP MIRRORS WITH FEEDBACK AND A SLOW NONLINEARITY", Opt. Commun., vol. 134, pp 43–48, 1997]. Among these complicated characteristics, there can be obtained a stable frequency dividing mode having a half of the input pulse stream repetition rate.

In the above, the present invention was described based on the specific embodiment, but the present invention will not be limited by the specific embodiment. That is, it should be apparent to those ordinarily skilled in the art that various changes and modifications can be added without departing from the spirit and scope of the present invention which are defined in the appended claims.

According to the present invention as described above, the feedback optical pulses and the input optical pulses are subjected to a time interleaving so as to make them not overlapped together, and then they are subjected to a time correlation, thereby considerably reducing the polarized beam dependence of the input optical pulse streams. Further, the time correlator includes the semiconductor optical amplifier, and therefore, the product can be miniaturized, with the result that the operation can be carried out with a minimal energy.

What is claimed is:

1. An apparatus for controlling cycles of optical pulse steams, comprising:

a clock generating means for generating clocks;

an optical pulse generating means for receiving the clocks from said clock generating means to generate optical pulses in synchronization with the clocks of said clock generating means;

an input optical pulse distributing means for distributing feedback optical pulses of an output optical pulse distributing means, and for distributing the optical pulses of said optical pulse generating means;

a time correlation means for correlating a time of optical pulses of said input optical pulse distributing means;

an optical pulse transferring/processing means for amplifying and filtering the optical pulses of said time correlation means, and for attenuating them before transferring them; and said output optical pulse distributing means distributing the optical pulses of said optical pulse transferring/processing means to transfer them to an output terminal and to said input optical pulse distributing means.

2. The apparatus as claimed in claim 1, further comprising:

a clock amplifying means for amplifying the clocks of said clock generating means;

a first polarization adjusting means for adjusting a polarization of the optical pulses of said optical pulse generating means to transfer them to said input optical pulse distributing means;

an optical transmitting/breaking means for transmitting optical pulses of said input optical pulse distributing means, and for preventing optical signals of said time correlation means from being transmitted to said input optical pulse distributing means; and a second polarization adjusting means for adjusting polarizations of optical pulses of said output optical distributing means to feed back them to said input optical distributing means.

3. The apparatus as claimed in any one of claims 1 and 2, wherein said time correlation means comprises:

a distributing/coupling means for distributing optical pulses of said input optical distributing means at a predetermined ratio, and for coupling optical pulses of a third polarization adjusting means and said optical amplifying means to output them to said optical pulse transferring/processing means;

said optical amplifying means amplifying optical pulses of said distributing/coupling means to transfer them to a delay means, and amplifying optical pulses of said delay means to transfer them to said distributing/coupling means;

said delay means delaying optical pulses of said optical amplifying means to transfer them to said third polarization adjusting means, and delaying optical pulses of said third polarization adjusting means to transfer them to said optical amplifying means;

said third polarization adjusting means adjusting optical pulses of said delay means to transfer them to said distributing/coupling means, and adjusting optical pulses of said distributing/coupling means to transfer them to said delay means; and a filtering means for filtering optical pulses of said distributing/coupling means to remove noises so as to output them to said optical pulse transferring/processing means.

4. The apparatus as claimed in any one of claims 1 and 2, wherein said optical pulse transferring/processing means comprises:

an optical amplifying means for amplifying optical pulses from said time correlation means;

a filtering means for removing noises by filtering output optical pulses of said optical amplifying means;

an optical pulse attenuating means for variably attenuating the optical pulses after their noise removal by said filtering means; and a delay means for delaying the attenuated optical pulses of said optical pulse attenuating means to transfer them to said output optical pulse distributing means.

* * * * *